United States Patent
Tabata et al.

(10) Patent No.: US 8,736,235 B2
(45) Date of Patent: May 27, 2014

(54) POWER GENERATION MOTOR CONTROL SYSTEM

(75) Inventors: Mitsunori Tabata, Chiyoda-ku (JP); Masato Mori, Chiyoda-ku (JP); Kenji Nakajima, Chiyoda-ku (JP); Kenichi Akita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 396 days.

(21) Appl. No.: 13/274,400

(22) Filed: Oct. 17, 2011

(65) Prior Publication Data

US 2012/0261916 A1 Oct. 18, 2012

(30) Foreign Application Priority Data

Apr. 18, 2011 (JP) .................................. 2011-091891

(51) Int. Cl.
*H02P 9/10* (2006.01)
(52) U.S. Cl.
USPC .............................................. 322/59; 322/89
(58) Field of Classification Search
USPC .......................................... 322/28, 37, 59, 89
See application file for complete search history.

(56) References Cited

U.S. PATENT DOCUMENTS

| | | | |
|---|---|---|---|
| 6,049,196 A * | 4/2000 | Arai et al. ........................ | 322/61 |
| 7,592,785 B2 * | 9/2009 | Kimura et al. .................. | 322/59 |
| 7,944,183 B2 * | 5/2011 | Nishimura ...................... | 322/28 |
| 2006/0164045 A1 * | 7/2006 | Gibbs et al. ..................... | 322/19 |
| 2008/0186000 A1 * | 8/2008 | Kimura et al. .................. | 322/23 |

FOREIGN PATENT DOCUMENTS

| | | |
|---|---|---|
| JP | 02-246799 A | 10/1990 |
| JP | 07-303301 A | 11/1995 |
| JP | 2003-113763 A | 4/2003 |
| JP | 2005-020804 A | 1/2005 |
| JP | 2005-127199 A | 5/2005 |
| JP | 4493639 B2 | 4/2010 |

* cited by examiner

*Primary Examiner* — Nicholas Ponomarenko
(74) *Attorney, Agent, or Firm* — Sughrue Mion, PLLC (57) ABSTRACT

A power-generation motor control system is a control system that controls a power-generation motor provided with an armature and a magnetic-field winding, and is characterized in that when the power-generation motor is operated as a motor, before a power source energizes the armature, a preliminary excitation current, with the value of which the induction voltage across the armature does not exceed the voltage of the power source, is applied to the magnetic-field winding in accordance with the rotation speed of the power-generation motor so that preliminary excitation of the power-generation motor is performed.

6 Claims, 6 Drawing Sheets

POWER GENERATION MOTOR CONTROL SYSTEM

BACKGROUND OF THE INVENTION

1. Field of the Invention

The present invention relates to a power-generation motor control system that is mainly mounted in a vehicle, operates as a motor when an engine starts or when it assists the torque of the engine, and can operate also as an electric power generator after the engine has started.

2. Description of the Related Art

In recent years, in order to raise gasoline mileage and conformity to the environment standard, there has been developed a vehicle that is equipped with a power-generation motor and performs a so-called idling stop in which the engine is stopped when the vehicle stops and the power-generation motor is driven so as to restart the engine when the vehicle starts. Because the power-generation motor utilized in such a vehicle as described above is required to be small-size, low-cost, and high-torque; therefore, in many cases, a magnetic-field-winding synchronous power-generation motor is utilized, as the power-generation motor (e.g., refer to Patent Document 1).

In some cases, in a magnetic-field-winding synchronous power generation motor, torque control is performed by controlling the magnetic-field current and the armature current. In this case, when the value of a driving torque command is small, the value of a magnetic-field current command at a time when driving is performed also becomes smaller than a rated value (e.g., refer to Patent Document 2).

PRIOR ART REFERENCE

Patent Document

[Patent Document 1] Japanese Patent Application Laid-Open No. 2003-113763
[Patent Document 2] Japanese Patent No. 4493639 (Specification, Drawings)

The Patent Document 1 discloses driving of the power-generation motor that is begun at a time when the engine has started, i.e., at a time when the power-generation motor is in a complete standstill. However, in effect, as the methods of driving the power-generation motor, there is a method in which the engine is driven while the power-generation motor rotates, in addition to the case where as disclosed in Patent Document 1, driving of the power-generation motor that is begun at a time when the power-generation motor is in a complete standstill.

For example, there exists a case, which is referred to as "change of mind", in which while the engine is almost stopping and inertially rotating because the fuel does not burn, the engine is restarted. In this case, in order to make the power-generation motor generate large driving torque, it is required that driving of the power-generation motor is begun at a time when the power-generation motor is rotating. However, in such a case, unless preliminary excitation of the power-generation motor is carried out, the torque of the power-generation motor becomes insufficient, whereby it may take a long time to restart the engine.

Meanwhile, in the case where driving of the power-generation motor is begun at a time when the power-generation motor is rotating, preliminary excitation may cause the power-generation motor to unintentionally generate electric power. In other words, because when the power-generation motor is in a standstill, no induction voltage is produced across the armature, no problem is posed even when a magnetic-field current as large as the rated current is applied to the magnetic-field winding; however, in the case where when the power-generation motor is rotating, a magnetic-field current is applied to the magnetic-field winding, an induction voltage, corresponding to the magnetic-field current amount and the rotation speed of the power-generation motor, is produced across the armature; when the induction voltage exceeds the power-source voltage, the power-generation motor starts to generate electric power.

Such unintentional power generation by the power-generation motor produces torque having a direction contrary to that of the torque at a time when the power-generation motor is driven; therefore, even though it is tried to restart the engine, the torque is exerted on the engine in such a way as to brake the engine, whereby the restartability of the engine is deteriorated. Moreover, as described above, the magnetic-field current applied through the preliminary excitation of the power-generation motor is as large as the rated current; thus, depending on the engine rotation speed, i.e., the rotation speed of the power-generation motor at a time when the preliminary excitation is carried out, an excessive induction voltage may be produced, thereby providing an adverse effect to the battery or other vehicle apparatuses.

As described above, in the conventional technology disclosed in Patent Document 1, there is considered only the matter that preliminary excitation is carried out when the engine is restarted from its state where the engine is in a complete standstill; therefore, there has been a problem that it is difficult to carry out preliminary excitation of the power-generation motor while the engine rotates, i.e., while the power-generation motor rotates, as in the case where the engine is restarted before it completely stops.

SUMMARY OF THE INVENTION

The present invention has been implemented in order to solve the foregoing problems in a conventional apparatus; the objective thereof is to provide an in-vehicle power-generation motor control system that can perform optimum preliminary excitation in accordance with the operation status of a power-generation motor.

A power-generation motor control system according to the present invention is a control system that controls a power-generation motor provided with an armature and a magnetic-field winding and in which when the power-generation motor is operated as a motor, before a power source energizes the armature, a preliminary excitation current, with the value of which the induction voltage across the armature does not exceed the voltage of the power source, is applied to the magnetic-field winding in accordance with the rotation speed of the power-generation motor so that preliminary excitation of the power-generation motor is performed.

In a power-generation motor control system according to the present invention, when the power-generation motor is operated as a motor, before a power source energizes the armature, a preliminary excitation current, with the value of which the induction voltage across the armature does not exceed the voltage of the power source, is applied to the magnetic-field winding in accordance with the rotation speed of the power-generation motor so that preliminary excitation of the power-generation motor is performed; therefore, the power-generation motor control system can perform optimum preliminary excitation in accordance with the operation status of a power-generation motor, whereby it can be prevented that electric power is generated in an unintended manner or that the characteristics are deteriorated due to insufficient preliminary excitation.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
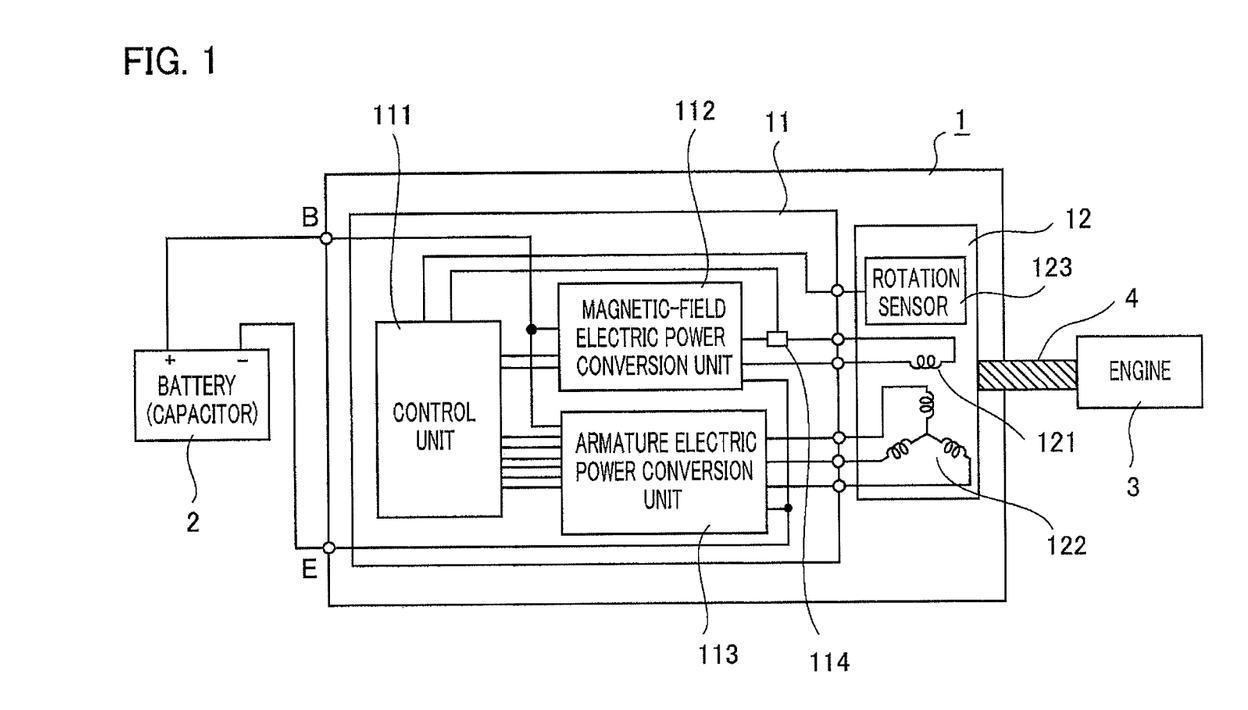
FIG. 1 is an explanatory diagram illustrating the configuration of a power-generation motor control system according to Embodiment 1 of the present invention.

Hereinafter, a power-generation motor control system according to Embodiment 1 of the present invention will be explained with reference to the drawings. FIG. 1 is an explanatory diagram illustrating the configuration of a power-generation motor control system according to Embodiment 1 of the present invention. In FIG. 1, a power-generation motor apparatus 1 is configured with an inverter 11 and a power-generation motor 12. The power-generation motor 12 is coupled with an engine 3 through the intermediary of a driving power transfer unit 4 such as a belt. When the engine 3 is started, the power-generation motor 12 is supplied, by way of terminals B and E, with electric power by a power source 2 formed of a battery or a capacitor, and operates as a motor so as to rotate and start the engine 3 by the intermediary of the driving power transfer unit 4.

On the other hand, the power-generation motor 12 operates as an electric power generator while the engine 3 operates, and supplies the power source 2 with the generates electric power by way of the terminals B and E so as to charge the power source 2 up to a predetermined voltage. In some cases, the power-generation motor 12 operates as a motor that assists the torque of the engine 3 while the engine 3 operates.

A command of operation mode is instructed through a controller, a key switch, or the like of an external idling stop system, which is unillustrated in FIG. 1; the power-generation motor 12 is operated in a mode according to the command.

The power-generation motor 12 is formed of a synchronous electric rotating machine including an armature winding 122 provided in the stator thereof and a magnetic-field winding 121 provided in the rotor thereof. In the power-generation motor 12, there is provided a rotation sensor 123 that detects the rotation speed of the rotor.

The inverter 11 is provided with a magnetic-field electric power conversion unit 112 connected with the magnetic-field winding 121 of the power-generation motor 12, an armature electric power conversion unit 113 connected with the armature winding 122 of the power-generation motor 12, a control unit 111 that issues an on/off command for an electric-power conversion device to the magnetic-field electric power conversion unit 112 and the armature electric power conversion unit 113, and a current sensor 114 for detecting a magnetic-field current. The inverter 11 forms a power-generation motor control system according to Embodiment 1 of the present invention.

The magnetic-field electric power conversion unit 112 operates in response to the on/off command for the electric-power conversion device from the control unit 111 and controls, through PWM control, the magnetic-field current that flows in the magnetic-field winding 121. In general, the magnetic-field electric power conversion unit 112 is formed of a half bridge circuit configured with MOSFETs.

In general, as the armature electric power conversion unit 113, a three-phase bridge circuit configured with MOSFETs is utilized. When the power-generation motor 12 is driven to operate as a motor, the armature electric power conversion unit 113 operates in response to the on/off command for the electric-power conversion device from the control unit 111 and makes a three-phase alternating current, as an armature current, flow in the armature winding 122. At the same time, the magnetic-field electric power conversion unit 112 applies a direct current, as a magnetic-field current, to the magnetic-field winding 121. As a result, the power-generation motor 12 operates as a three-phase synchronous motor and starts the engine 3 by the intermediary of the driving power transfer unit 4.

In contrast, when the power-generation motor 12 is operated as an electric power generator, the armature electric power conversion unit 113 rectifies the armature current, which is a three-phase alternating current from the armature winding 122, to obtain a direct current, and supplies the direct current to the battery so as to charge the battery and to other loads. As is well known, the power-generation motor 12 operates, as an electric power generator, in such a way that while the rotor is driven to rotate by the engine 3 by the intermediary of the driving power transfer unit 4, the magnetic-field electric power conversion unit 112 supplies the magnetic-field current, which is a direct current, to the magnetic-field winding 121 of the rotor so as to induce a three-phase AC voltage in the armature winding 122.

Figure 2:
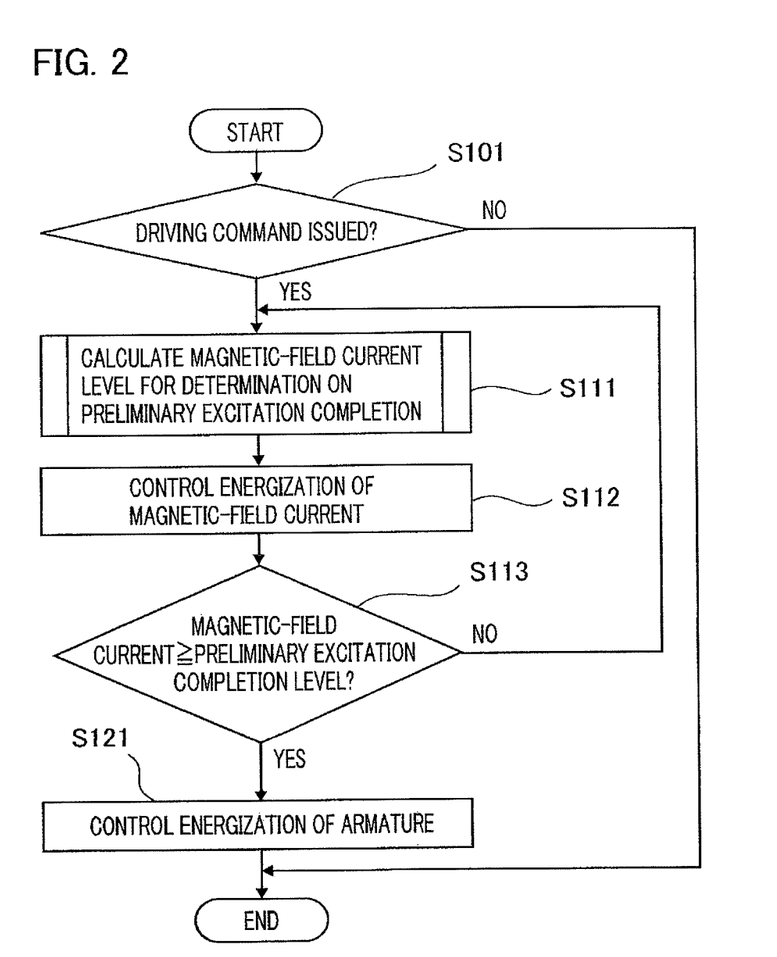
FIG. 2 is a flowchart representing the operation of a power-generation motor control system according to Embodiment 1 of the present invention.

Next, there will be explained the operation of the power-generation motor control system, according to Embodiment 1 of the present invention, that is configured as described above. FIG. 2 is a flowchart representing the operation of a power-generation motor control system according to Embodiment 1 of the present invention. In FIG. 2, at first, in the step S101, it is determined whether or not a driving command has been issued from the controller, the key switch, or the like of the idling stop system. In the case where a driving command has been issued (YES), the step S101 is followed by the step S111; in the case where no driving command has been issued (NO), the processing is ended because no driving processing is performed.

Because in FIG. 2, only the process related to the present invention is represented, the explanations for other processes are omitted; however, in the case where even when a driving command has issued, the power-generation motor 12 is abnormal or the power-source voltage is out of a specified range, no driving is performed.

In the step S111, there is calculated a level of the magnetic-field current (referred to as a preliminary excitation completion level, hereinafter) utilized in completion determination on the preliminary excitation of the power-generation motor 12.

In this situation, the calculation method for the preliminary excitation completion level will be explained. As described above, the induction voltage across the armature winding 122 of the power-generation motor 12 varies depending on the rotation speed of the rotor of the power-generation motor 12 and the magnetic-field current. If the induction voltage exceeds the voltage of the power source 2, the power-generation motor 12 operates as an electric power generator; therefore, it is required that the induction voltage across the armature winding 122 is lower than the power-source voltage.

It is desirable that in order to raise the effect of preliminary excitation, the magnetic-field current at a time when the energization of the armature winding 122 is started is made as large as possible but smaller than the rated current. Accordingly, the effect of preliminary excitation becomes maximum when the induction voltage across the armature winding 122 is made as large as possible but lower than the power-source voltage.

Figure 3:
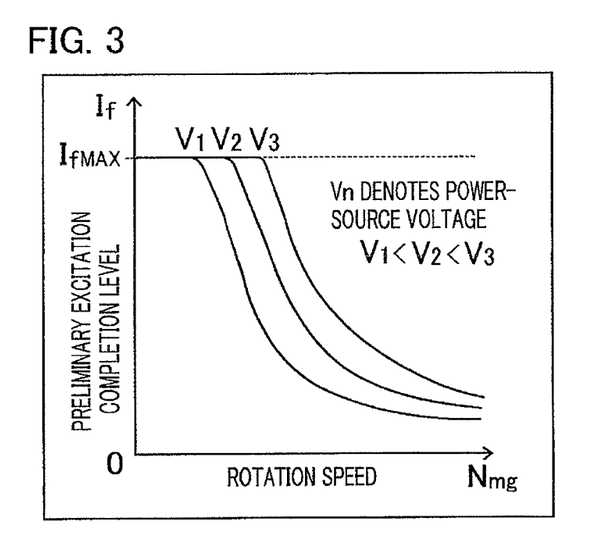
FIG. 3 is a map representing the magnetic-field current level for preliminary excitation in a power-generation motor control system according to Embodiment 1 of the present invention.

For that purpose, there is preliminarily acquired a map for obtaining the preliminary excitation completion level, based on the rotation speed of the rotor of the power-generation motor 12 and the power-source voltage, and then the preliminary excitation completion level is obtained with reference to the map. FIG. 3 is a map representing the magnetic-field current level for preliminary excitation in a power-generation motor control system according to Embodiment 1 of the present invention. In FIG. 3, the value of $I_{fMAX}$ denotes the rated magnetic-field current. In addition, in FIG. 3, as examples, three power-source voltages, i.e., $V_1$, $V_2$, and $V_3$ are represented.

In the flowchart represented in FIG. 2, in the step S112, the magnetic-field current is applied to the magnetic-field winding 121. As the controlling method for the magnetic-field current energization, there may be performed PI control in which the magnetic-field current at a time when the preliminary excitation is ended is utilized as a command value, or there may be performed control in which in order to raise the responsiveness of the magnetic-field current, the conduction rate of PWM control is set to 100[%].

In the step S113, it is determined whether or not the magnetic-field current measured by the magnetic-field current sensor 114 has reached the preliminary excitation completion level. In the case where the magnetic-field current has reached the preliminary excitation completion level (YES), the step S113 is followed by the step 5121; in the case where the magnetic-field current has not reached the preliminary excitation completion level (NO), the step S111 is resumed.

In the step S121, the on/off command for an electric-power conversion device is issued to the armature electric power conversion unit 113, so that the energization of the armature winding 122 is started. As stated above, in the case where in the step S113, it is determined that the magnetic-field current has not reached the preliminary excitation completion level (NO), there is resumed the processing of calculating the preliminary excitation completion level in the step S111; this is because as described above, the preliminary excitation completion level varies depending on the condition such as the rotation speed.

As described above, the power-generation motor control system according to Embodiment 1 of the present invention makes it possible to perform the optimum preliminary excitation in accordance with the rotation speed of the power-generation motor and the power-source voltage.

Embodiment 2

Next, there will be explained a power-generation motor control system according to Embodiment 2 of the present invention. In Embodiment 2 of the present invention, the method of calculating the magnetic-field current level for the completion determination on the preliminary excitation is changed, in comparison to Embodiment 1. Other parts are similar to those in Embodiment 1; therefore, in the following explanation, only the parts peculiar to Embodiment 2 will be explained.

As described above, in a magnetic-field-winding synchronous power generation motor, in some cases, the torque control is performed by controlling the magnetic-field current and the armature current; thus, in the case where the driving torque command is small, the magnetic-field current command at a time when driving is performed also becomes smaller than the rated value (refer to Patent Document 2, FIG. 10). In this case, when the preliminary excitation according to Embodiment 1 is performed, the preliminary excitation completion level may become higher than the magnetic-field current command at a time of driving. When being performed to the extent that it reaches the magnetic-field current at a time of driving, the preliminary excitation is sufficient; if the preliminary excitation is further performed, the torque at a timing when driving is started becomes larger than a desired torque.

Figure 4:
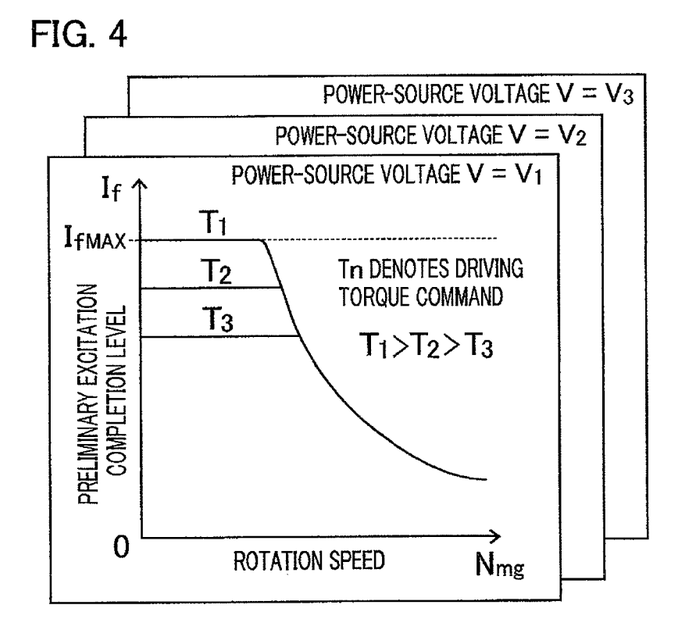
FIG. 4 is a map representing the magnetic-field current level for preliminary excitation in a power-generation motor control system according to Embodiment 2 of the present invention.

Accordingly, in a power-generation motor control system according to Embodiment 2 of the present invention, based on the rotation speed of the rotor of a power-generation motor, the power-source voltage and the torque command at a time when the power-generation motor is driven, there is preliminarily created a map for obtaining the preliminary excitation completion level; then, the preliminary excitation completion level is obtained with reference to the map. FIG. 4 is a map representing the magnetic-field current level for preliminary excitation in a power-generation motor control system according to Embodiment 2 of the present invention.

That is to say, as represented in FIG. 4, for the respective power-source voltages $V_1$, $V_2$, and $V_3$, there are preliminarily obtained, as the characteristics indicated by the solid lines, the preliminary excitation completion levels, in accordance with the values $T_1$, $T_2$, and $T_3$ ($T_1 > T_2 > T_3$) of the driving torque command at a time when the driving is started and the rotation speed N; then, the map is preliminarily creates. The driving torque commands and the preliminary excitation completion levels represented in FIG. 4 are just schematic ones; thus, the relationships represented in FIG. 4 are not necessarily established.

As described above, the power-generation motor control system according to Embodiment 2 of the present invention makes it possible to perform the optimum preliminary excitation in accordance with the rotation speed of the power-generation motor, the power-source voltage, and the driving torque command.

Embodiment 3

Next, there will be explained a power-generation motor control system according to Embodiment 3 of the present invention. In Embodiment 3 of the present invention, the preliminary excitation completion condition is changed, in comparison to Embodiment 1. Other parts are similar to those in Embodiment 1 or Embodiment 2; therefore, only the parts peculiar to Embodiment 3 will be explained.

Figure 5:
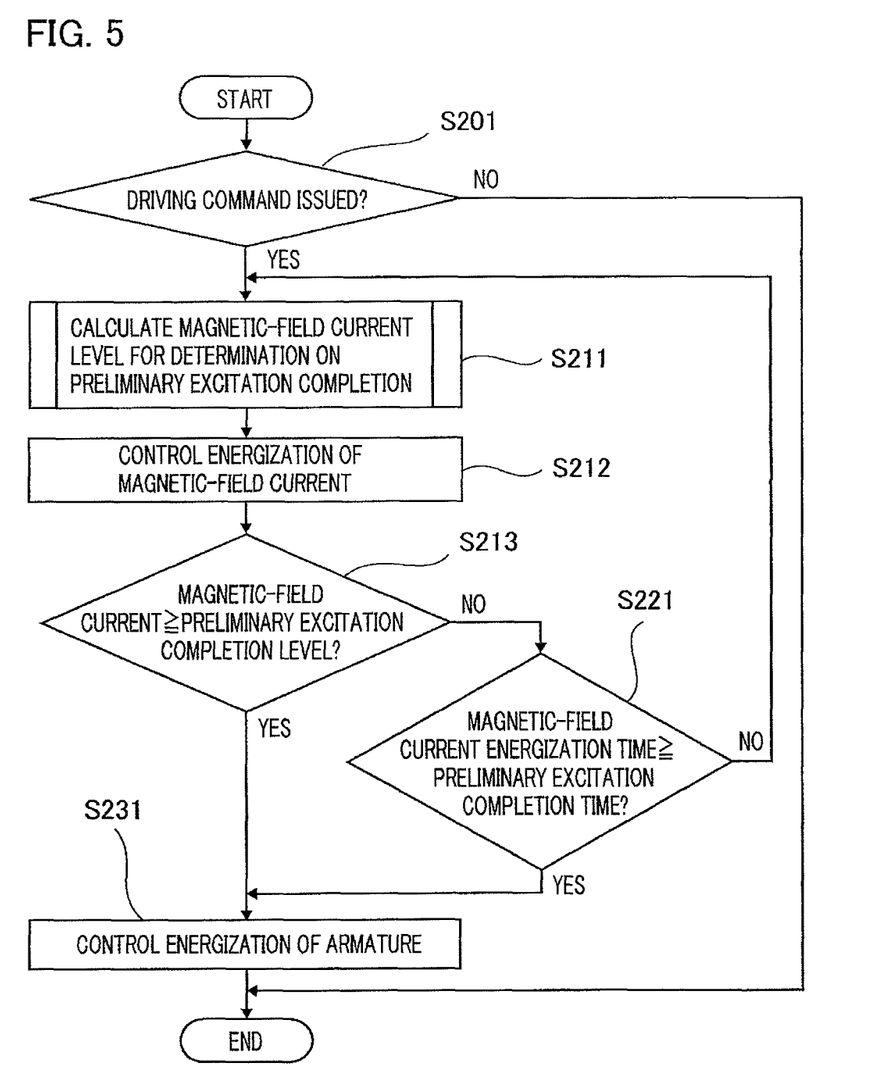
FIG. 5 is a flowchart for explaining the operation of a power-generation motor control system according to Embodiment 3 of the present invention.

FIG. 5 is a flowchart for explaining the operation of a power-generation motor control system according to Embodiment 3 of the present invention. In FIG. 5, what is different from Embodiment 1 is that in the case where in the step S213, it is determined that the magnetic-field current has not reached the preliminary excitation completion level (NO), a different action is taken.

In Embodiment 1, the energization of the armature is not performed until the magnetic-field current reaches the preliminary excitation completion level. However, for example, in the case where when the temperature of the power-generation motor 12 is high, the resistance value of the magnetic-field winding 121 increases and hence the magnetic-field current does not increase up to the preliminary excitation completion level obtained from a preliminarily set, the energization of the armature winding 122 may not be started.

Accordingly, in Embodiment 3, in the case where after the preliminary excitation has started, it is determined in the step S213 that the magnetic-field current has not reached the preliminary excitation completion level (NO), the step S213 is followed by the step S221, where it is determined whether or not the magnetic-field current energization time is the same as or longer than the preliminary-excitation completion time. In the case where it is determined that the magnetic-field current energization time is the same as or longer than the preliminary-excitation completion time (Yes), the step S221 is followed by the step S231, where the energization of the armature winding 122 is started so as to drive the power-generation motor 12. In other words, after the preliminary-excitation completion time has elapsed, the energization of the armature winding 122 is started, even in the case where the magnetic-field current has not reached the preliminary excitation completion level.

In the case where it is determined in the step S221 that the magnetic-field current energization time has not reached the preliminary-excitation completion time (No), the step S211 is resumed. In the other steps, the same processing items as those of the flowchart in FIG. 2 of Embodiment 1 are performed.

The foregoing preliminary-excitation completion time, i.e., the time-out period of the preliminary excitation is set to be within a range, for example, from 0.5 through 1.0 times as long as the time constant of the magnetic-field winding 121.

In the foregoing power-generation motor control system according to Embodiment 3 of the present invention, even in the case where for some reason, the magnetic-field current does not reach a desired value, it can be prevented that the power-generation motor cannot be driven or the response becomes extremely slow.

Embodiment 4

Next, there will be explained a power-generation motor control system according to Embodiment 4 of the present invention. In Embodiment 4 of the present invention, the preliminary excitation completion condition is changed, in comparison to Embodiment 1. Other parts are similar to those in Embodiment 1; therefore, only the parts peculiar to Embodiment 4 will be explained.

In Embodiment 1, the condition for ending the preliminary excitation is determined by the level of the magnetic-field current; however, in some cases, detection of the magnetic-field current is delayed and hence the magnetic-field current cannot accurately be detected. Accordingly, in Embodiment 4, the conduction rate of the energization of the magnetic-field current is set to 100[%] so as to increase the magnetic-field current as soon as possible, and the completion determination on the preliminary excitation is performed based on the elapsed time from the start of the preliminary excitation.

Figure 6:
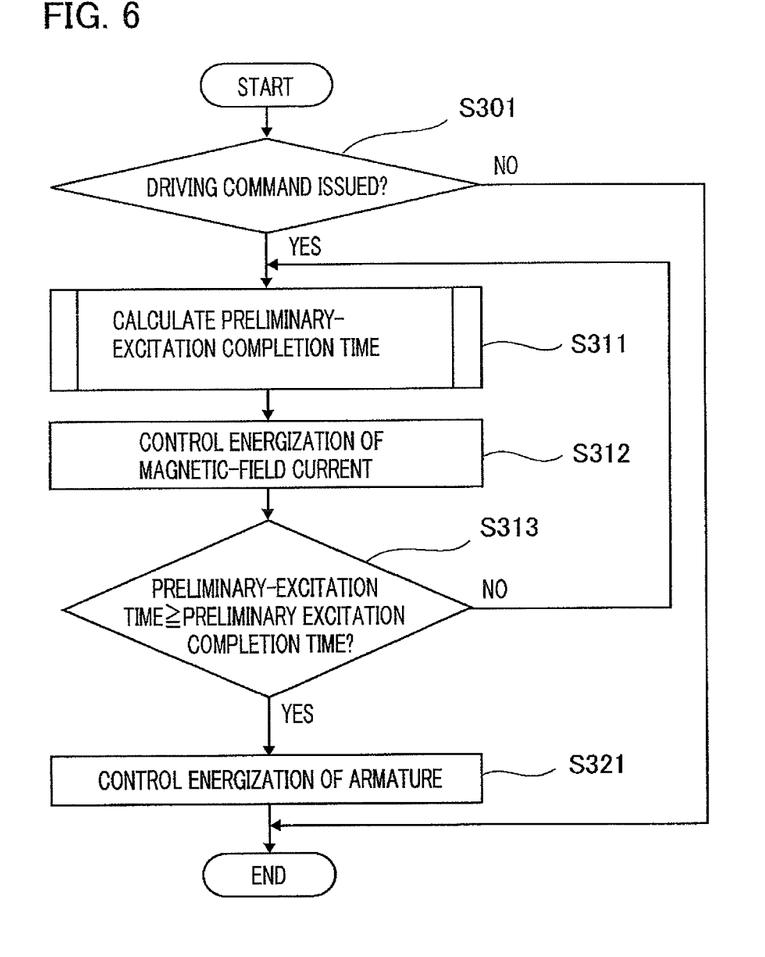
FIG. 6 is a flowchart for explaining the operation of a power-generation motor control system according to Embodiment 4 of the present invention.

FIG. 6 is a flowchart for explaining the operation of a power-generation motor control system according to Embodiment 4 of the present invention. In FIG. 6, in the case where it is determined in the step S301 that the driving command has been issued (Yes), the step S301 is followed by the step S311, where the preliminary-excitation completion time is calculated.

As described above, the effect of preliminary excitation becomes maximum when the induction voltage across the armature winding 122 is made as large as possible but lower than the power-source voltage. Accordingly, based on the rotation speed of the rotor of the power-generation motor 12, the power-source voltage, and the driving torque command, there is preliminarily created a map for obtaining the time in which after application of the magnetic-field current is started, the magnetic-field current reaches the preliminary excitation completion level; then, in the step S311, the preliminary-excitation completion time is obtained with reference to the map.

Figure 7:
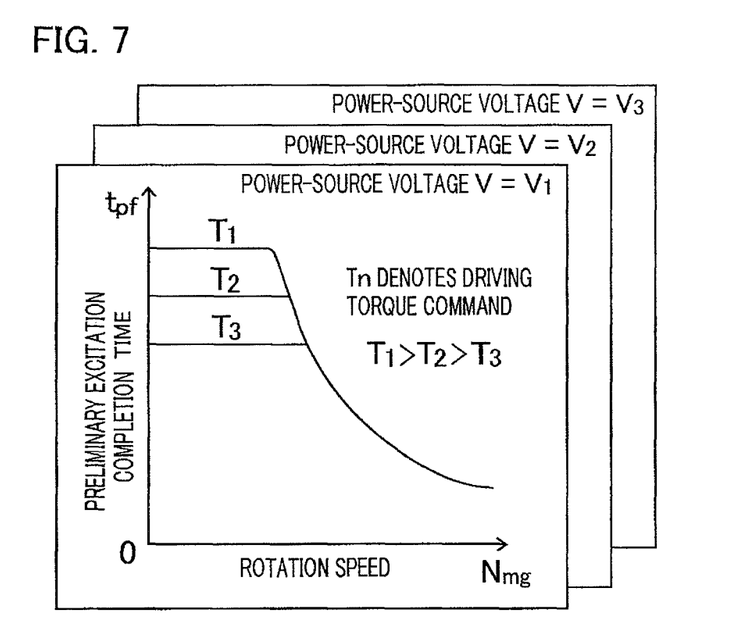
FIG. 7 is a map representing the preliminary-excitation completion time in a power-generation motor control system according to Embodiment 4 of the present invention.

FIG. 7 is a map representing the preliminary-excitation completion time in a power-generation motor control system according to Embodiment 4 of the present invention. That is to say, as represented in FIG. 7, for the respective power-source voltages $V_1$, $V_2$, and $V_3$, there are preliminarily obtained, as the characteristics indicated by the solid lines, the preliminary excitation completion times, in accordance with the values $T_1$, $T_2$, and $T_3$ ($T_1 > T_2 > T_3$) of the driving torque command at a time when the driving is started and the rotation speed N; then, the map is preliminarily creates. The driving torque commands and the preliminary excitation completion levels represented in FIG. 4 are just schematic ones; thus, the relationships represented in FIG. 7 are not necessarily established.

In FIG. 6, after, in the step S311, the preliminary-excitation completion time is obtained with reference to the map represented in FIG. 7, the step S311 is followed by the step S312, where application of the magnetic-field current is started. Next, in the step S313, it is determined whether or not the elapsed time from the start of the preliminary excitation has become the same as or longer than the preliminary-excitation completion time; in the case where it is determined that the elapsed time from the start of the preliminary excitation has become the same as or longer than the preliminary-excitation completion time (YES), the step S313 is followed by the step S321, where the energization of the armature winding 122 is started.

In the case where it is determined in the step S313 that the elapsed time from the start of the preliminary excitation has not become the same as or longer than the preliminary-excitation completion time (NO), the step S311 is resumed; then, the preliminary-excitation completion time is calculated again.

The power-generation motor control system according to Embodiment 4 of the present invention makes it possible to perform preliminary excitation without being affected by the delay in the detection of the magnetic-field current.

A power-generation motor control system according to the present invention, described heretofore, is characterized as follows:

(1) A power-generation motor control system according to the present invention is a control system that controls a power-generation motor provided with an armature and a magnetic-field winding, and is characterized in that when the power-generation motor is operated as a motor, before a power source energizes the armature, a preliminary excitation current, with the value of which the induction voltage across the armature does not exceed the voltage of the power source, is applied to the magnetic-field winding in accordance with the rotation speed of the power-generation motor so that preliminary excitation of the power-generation motor is performed.

In the power-generation motor control system, configured as described above, according to the present invention, the preliminary excitation level is determined by the rotation speed and the power-source voltage; therefore, driving can be started at an induction voltage that is as high as possible but does not cause any power generation, whereby the responsiveness can be raised.

(2) A power-generation motor control system according to the present invention is characterized in that in the foregoing (1), while the preliminary excitation is performed, a magnetic-field current flowing in the magnetic-field winding is detected, and when the detected magnetic-field current reaches a predetermined value determined by the rotation speed of the power-generation motor and the power-source voltage, energization of the armature is started.

In the power-generation motor control system, configured as described above, according to the present invention, feedback control of the magnetic-field current is performed; thus, the magnetic-field current can accurately be controlled.

(3) A power-generation motor control system according to the present invention is characterized in that in the foregoing (1), while the preliminary excitation is performed, a magnetic-field current flowing in the magnetic-field winding is detected, and when the detected magnetic-field current reaches a predetermined value determined by the rotation speed of the power-generation motor, the power-source voltage, and a driving torque command to the power-generation motor, energization of the armature is started.

In the power-generation motor control system, configured as described above, according to the present invention, in the case where a magnetic-field current command at a time of driving is smaller than a command at a time of driving preparation, the value of the magnetic-field current command is adopted as the command at a time of driving preparation, so that excessive preliminary excitation can be prevented.

(4) A power-generation motor control system according to the present invention is characterized in that in any one of the foregoing (1) through (3), when a predetermined time has elapsed from the start of the preliminary excitation, the preliminary excitation is ended, and energization of the armature is started.

In the power-generation motor control system, configured as described above, according to the present invention, in the case where for some reason, the magnetic-field current does not reach a specified value, the preliminary excitation can forcibly be cancelled.

(5) A power-generation motor control system according to the present invention is characterized in that in the foregoing (1), the time in which the preliminary excitation is performed is determined based on the rotation speed of the power-generation motor and the power-source voltage.

In the power-generation motor control system, configured as described above, according to the present invention, open-loop control is performed; therefore, unlike feedback control, the adverse effect of response delay can be eliminated.

(6) A power-generation motor control system according to the present invention is characterized in that in the foregoing (1), the time in which the preliminary excitation is performed is determined based on the rotation speed of the power-generation motor, the power-source voltage, and a driving torque command to the power-generation motor.

In the power-generation motor control system, configured as described above, according to the present invention, in the case where a magnetic-field current command at a time of driving is smaller than a command at a time of driving preparation, the value of the magnetic-field current command is adopted as the command at a time of driving preparation, so that excessive preliminary excitation can be prevented.

Various modifications and alterations of this invention will be apparent to those skilled in the art without departing from the scope and spirit of this invention, and it should be understood that this is not limited to the illustrative embodiments set forth herein.

What is claimed is:

1. A power-generation motor control system that controls a power-generation motor provided with an armature and a magnetic-field winding, wherein when the power-generation motor is operated as a motor, before a power source energizes the armature, a preliminary excitation current, with the value of which the induction voltage across the armature does not exceed the voltage of the power source, is applied to the magnetic-field winding in accordance with the rotation speed of the power-generation motor so that preliminary excitation of the power-generation motor is performed.

2. The power-generation motor control system according to claim 1, wherein while the preliminary excitation is performed, a magnetic-field current flowing in the magnetic-field winding is detected, and when the detected magnetic-field current reaches a predetermined value determined by the rotation speed of the power-generation motor and the power-source voltage, energization of the armature is started.

3. The power-generation motor control system according to claim 1, wherein while the preliminary excitation is performed, a magnetic-field current flowing in the magnetic-field winding is detected, and when the detected magnetic-field current reaches a predetermined value determined by the rotation speed of the power-generation motor, the power-source voltage, and a driving torque command to the power-generation motor, energization of the armature is started.

4. The power-generation motor control system according to claim 1, wherein when a predetermined time has elapsed from the start of the preliminary excitation, the preliminary excitation is ended, and energization of the armature is started.

5. The power-generation motor control system according to claim 1, wherein the time in which the preliminary excitation is performed is determined based on the rotation speed of the power-generation motor and the power-source voltage.

6. The power-generation motor control system according to claim 1, wherein the time in which the preliminary excitation is performed is determined based on the rotation speed of the power-generation motor, the power-source voltage, and a driving torque command to the power-generation motor.

* * * * *